United States Patent
Arihara et al.

(10) Patent No.: US 10,601,050 B2
(45) Date of Patent: Mar. 24, 2020

(54) ELECTRODE FOR CELL, AND CELL

(71) Applicant: Nissan Motor Co., Ltd., Yokohama-shi, Kanagawa (JP)

(72) Inventors: Kazuki Arihara, Kanagawa (JP); Takamasa Nakagawa, Kanagawa (JP); Hideaki Horie, Kanagawa (JP); Yuuki Kusachi, Kanagawa (JP); Masanori Koike, Kyoto (JP); Masatoshi Okura, Kyoto (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/346,597

(22) PCT Filed: Nov. 2, 2017

(86) PCT No.: PCT/JP2017/039763
§ 371 (c)(1),
(2) Date: May 1, 2019

(87) PCT Pub. No.: WO2018/084252
PCT Pub. Date: May 11, 2018

(65) Prior Publication Data
US 2019/0288293 A1    Sep. 19, 2019

(30) Foreign Application Priority Data

Nov. 4, 2016  (JP) .................................. 2016-216310
Sep. 27, 2017  (WO) .................. PCT/JP2017/035005

(51) Int. Cl.
*H01M 4/66* (2006.01)
*H01M 4/70* (2006.01)
(Continued)

(52) U.S. Cl.
CPC ............. *H01M 4/668* (2013.01); *H01M 4/02* (2013.01); *H01M 4/13* (2013.01); *H01M 4/66* (2013.01);
(Continued)

(58) Field of Classification Search
None
See application file for complete search history.

(56) References Cited

U.S. PATENT DOCUMENTS 9,780,359 B2 * 10/2017 Kim ...................... H01M 4/131
2009/0098457 A1 * 4/2009 Kwon ................. H01M 4/0404
429/209

(Continued)

FOREIGN PATENT DOCUMENTS

JP     2010153224 A     7/2010
JP     2011060560 A     3/2011
(Continued)

*Primary Examiner* — Amanda J Barrow
(74) *Attorney, Agent, or Firm* — Young Basile Hanlon & MacFarlane, P.C.

(57) ABSTRACT

An electrode for a cell includes a resin current collector that is planate and contains a resin and an electrically conductive filler, and an electrode active material layer that is disposed on at least one surface side of the resin current collector and that contains electrode active material particles. The resin current collector includes an electrically conductive layer on its surface side facing the electrode active material layer, the electrically conductive layer having configuration with recesses and projections. This configuration with recesses and projections satisfies the relationship given by formula (1): $h/\tan\theta < D$, in which $h$ is the average height of the configuration with recesses and projections, $\theta$ is the average inclination angle of the configuration with recesses and projections, and $D$ is the average particle diameter of the
(Continued)

electrode active material particles. A cell includes the electrode for a cell described above.

6 Claims, 3 Drawing Sheets

(51) Int. Cl.
  *H01M 4/13* (2010.01)
  *H01M 4/02* (2006.01)
(52) U.S. Cl.
  CPC ............. *H01M 4/667* (2013.01); *H01M 4/70* (2013.01); *H01M 2004/021* (2013.01)

(56) References Cited

U.S. PATENT DOCUMENTS

| | | | |
|---|---|---|---|
| 2013/0017440 A1* | 1/2013 | Takano | H01M 4/139 429/211 |
| 2014/0162122 A1* | 6/2014 | Kato | H01M 4/13 429/212 |
| 2014/0342222 A1 | 11/2014 | Kim et al. | |
| 2017/0279113 A1 | 9/2017 | Ohsawa et al. | |
| 2018/0090766 A1 | 3/2018 | Ohsawa et al. | |

FOREIGN PATENT DOCUMENTS

| | | |
|---|---|---|
| JP | 2014224028 A | 12/2014 |
| JP | 2016186917 A | 10/2016 |
| WO | 2013018686 A1 | 2/2013 |
| WO | 2016031688 A1 | 3/2016 |

* cited by examiner

ELECTRODE FOR CELL, AND CELL

CROSS-REFERENCE TO RELATED APPLICATIONS

The present application claims priority to Japanese Patent Application No. 2016-216310 filed on Nov. 4, 2016, and International Patent Application Serial No. PCT/JP2017/035005 filed on Sep. 27, 2017, the entire contents of which are herein incorporated by reference.

TECHNICAL FIELD

The present invention relates to an electrode for a cell, and to a cell.

BACKGROUND

In recent years, in order to address air pollution and global warming, it has been eagerly desired to reduce the amounts of carbon dioxide emitted. In the automotive field, the anticipation is that, by introducing electric vehicles and hybrid electric vehicles and so on, it will be possible to reduce the amounts of carbon dioxide emitted. And the development of cells for driving electric motors is a key to practical implementation of such vehicles, and is being energetically performed.

Attention is being directed to a lithium ion secondary cell as a cell for driving an electric motor, since they have high theoretical energy, and currently their development is progressing rapidly to achieve a cell with higher performance. Generally, a lithium ion secondary cell includes a positive electrode, a negative electrode and an electrolyte disposed between these, all housed in a cell casing. The positive electrode is formed by applying a positive electrode slurry including a positive electrode active material upon surface of a current collector, and the negative electrode is formed by applying a negative electrode slurry including a negative electrode active material upon surface of a current collector.

In the prior art, an electrode structure, in which the adhesion between a surface of a current collector and an active material layer provided on a current collector is improved, has been proposed. In this electrode structure, an electrically conductive resin layer is formed upon at least one side of an electrically conductive substrate, the surface roughness Ra of this electrically conductive resin layer is 0.1 μm or greater and 1.0 μm or less, a current collector that is employed is in a range satisfying $(1/5)t+0.5 \leq \theta a \leq (1/3)t+10$, when the layer thickness of this electrically conductive resin layer is termed t [μm] and the average inclination angle of the recesses and projections on the surface of the resin layer is termed θa [°], and an active material layer formed upon this electrically conductive resin layer is employed (Please refer to International Publication No. 2013/018686.).

SUMMARY

However, there is the problem that, with the electrode structure described in International Publication No. 2013/018686, reduction of the contact resistance between the electrically conductive resin layer and the active material layer is not sufficient, and it is not possible to apply a resin current collector to the entire current collector.

The present invention has been conceived in consideration of this type of problem with the prior art. And the object of the present invention is to provide an electrode for a cell, and a cell, in which it is possible to reduce the contact resistance between the resin current collector and the active material layer.

The present inventors have conducted diligent investigations in order to attain the object described above. And, as a result, they have found that it is possible to attain the object described above by providing an electrically conductive layer on the surface side of a resin current collector that faces toward an electrode active material layer, the electrically conductive layer having a configuration with recesses and projections which satisfies a predetermined relationship, and thereby the present invention has been brought to completion.

According to the present invention, it is possible to provide an electrode for a cell, and a cell, in which it is possible to reduce the contact resistance between the resin current collector and the active material layer.

DETAILED DESCRIPTION

Figure 1:
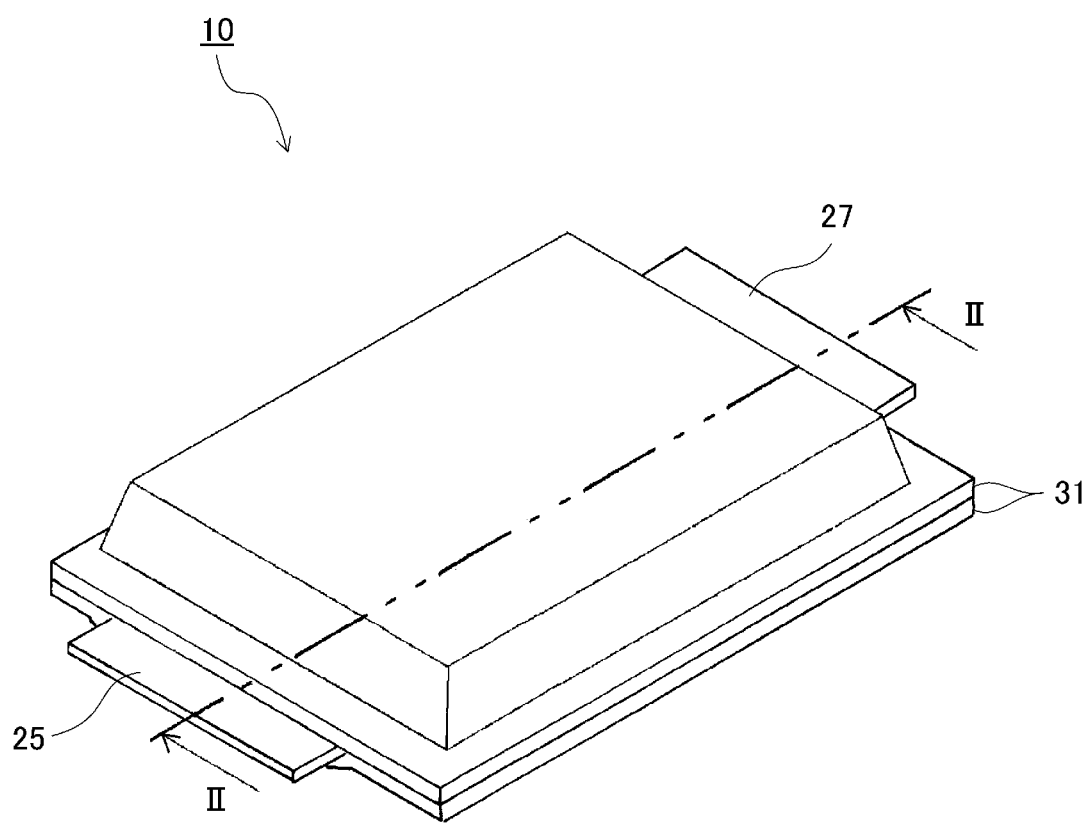
FIG. 1 is a schematic perspective view illustrating the external appearance of a cell according to an embodiment of the present invention.

In the following, an electrode for a cell, and a cell, according to an embodiment of the present invention will be explained in detail.

First, the electrode for a cell according to this embodiment comprises a resin current collector that is planate and contains a resin and an electrically conductive filler, and an electrode active material layer containing electrode active material particles disposed on at least one surface side of the resin current collector. And the resin current collector comprises an electrically conductive layer having a configuration with recesses and projections on its surface side toward the electrode active material layer. Furthermore, the configuration with recesses and projections satisfies the relationship expressed by Formula (1): $h/\tan\theta < D$ (where h is the average height of the configuration with recesses and projections, θ is the average inclination angle of the configuration with recesses and projections, and D is the average particle diameter of the particles of the electrode active material).

Here, in the present invention, "the average height (h) of configuration with recesses and projections" is a calculated average height that is obtained by dividing the sum of the heights of the cross sectional curve elements upon a standard length of a cross sectional curve, which is an example of a contour curve stipulated by JIS B 0601, by the number of cross-sectional curve elements. It is also possible to calculate the average value by defining a cross sectional curve by actually observing a scanning electron microscopic image of a cross section of an electrode for a cell. When calculating this type of average value, for example, the average value may be measured for the configuration with recesses and projections that is observed in ten fields of view.

Moreover, in the present invention, "the average inclination angle (θ) of configuration with recesses and projections" may, for example, be obtained by measuring, on a scanning electron microscopic image of a cross section of an electrode for a cell, the angles subtended by the bottom sides of valleys included in the configuration with recesses and projections of the electrically conductive layer and the ridge lines of mountains (or, for example, line segments joining the bottoms of the valley and the summits of the mountains or the like would also be acceptable,), and calculating the average value thereof. When calculating this type of average value, for example, the measurements are conducted for the configuration with recesses and projections that is observed in ten fields of view.

Furthermore, in the present invention, "the average particle diameter (D) of electrode active material particles" may, for example, be obtained by measuring, on a scanning electron microscopic image of the electrode active material powder itself or of a cross section of an electrode for a cell, the maximum distances between any two points on the outlines of electrode active material particles, and calculating the average value thereof. When calculating this type of average value, for example, the measurements are conducted for particles that are observed in ten fields of view.

With an electrode for a cell of this type it is possible effectively to increase contact locations between the electrically conductive layer and the electrode active material particles in the electrode active material layer. As a result, it is possible to reduce the contact resistance between the resin current collector and the electrode active material layer.

And, in the electrode for a cell according to this embodiment, it is preferable for the electrode active material particles not to be adhered together by binder. With this type of the electrode for a cell, it is possible more effectively to increase contact locations between the electrically conductive layer and the electrode active material particles in the electrode active material layer. As a result, it is possible further to reduce the contact resistance between the resin current collector and the electrode active material layer.

In the electrode active material layer, in a situation in which the electrode active material particles are not adhered together by binder, the adhesion between the electrode active material layer and the resin current collector may be reduced, and as a result in some cases the contact resistance is undesirably increased. However, by providing an electrically conductive layer having configuration with recesses and projections satisfying a predetermined relationship upon the surface of the resin current collector that faces toward the electrode active material layer, and by also arranging that, in the electrode active material layer, the electrode active material particles are not adhered together with binder, it is ensured that the adhesion is enhanced between the electrically conductive layer having the configuration with recesses and projections for which the predetermined relationship is satisfied and the electrode active material layer including the electrode active material particles that are not adhered together with any binder. Due to this, it is possible more effectively to increase contact locations between the electrically conductive layer and the electrode active material particles in the electrode active material layer. As a result, it is possible further to reduce the contact resistance between the resin current collector and the electrode active material layer.

Furthermore, with the electrode for a cell of this embodiment, it is preferable for the average height (h) of the configuration with recesses and projections to be 0.1 μm or greater and 20 μm or less. With this type of electrode for a cell, it is possible to effectively increase contact locations between the electrically conductive layer and the electrode active material particles in the electrode active material layer. As a result, it is possible further to reduce the contact resistance between the resin current collector and the electrode active material layer.

In other words, it is preferable for the average height (h) of the configuration with recesses and projections to be 0.1 μm or greater and 20 μm or less, because it is possible efficiently to increase contact locations with an active material whose particle diameter is from 0.1 to 100 μm; and it is more preferable for the average height (h) of the configuration with recesses and projections to be 1 μm or greater and 10 μm or less, because it is possible efficiently to increase contact locations with an active material whose particle diameter is from 1 μm to 20 μm.

Moreover, in the electrode for a cell according to this embodiment, the electrically conductive layer contains electrically conductive particles, and it is preferred for the electrically conductive particles to satisfy the relationship given by Formula (2): A<D (in this formula, A is the average particle diameter of the electrically conductive particles, and D is the average particle diameter of the electrode active material particles).

Here, in the present invention, "the average particle diameter (A) of electrically conductive particles" may, for example, be obtained by measuring, on a scanning electron microscopic image of the electrically conductive powder itself or of a cross section of the electrode for a cell, the maximum distances between any two points on the outlines of electrically conductive particles, and calculating the average value thereof. When calculating this type of average value, for example, the measurements are conducted for particles that are observed in ten fields of view.

With this type of electrode for a cell, the configuration with recesses and projections of the electrically conductive layer is more appropriately formed, and it is possible more effectively to increase contact locations between the electrically conductive layer and the electrode active material particles in the electrode active material layer. As a result, it is possible further to reduce the contact resistance between the resin current collector and the electrode active material layer.

Yet further, in the electrode for a cell of this embodiment, it is preferable for the average particle diameter (A) of the electrically conductive particles to be less than or equal to No lower limit for the average particle diameter of the electrically conductive particles is particularly stipulated. However, from the standpoint of ease of handling and so on, it is desirable for this lower limit to be 0.01 μm or greater. In this type of electrode for a cell, the configuration with recesses and projections of the electrically conductive layer is more appropriately formed, and thereby it is possible more effectively to increase contact locations between the electrically conductive layer and the electrode active material particles in the electrode active material layer. As a result, it is possible further to reduce the contact resistance between the resin current collector and the electrode active material layer.

In other words, it is preferable for the average particle diameter (A) of the electrically conductive particles to be 20 μm or less, because it is possible to ensure that the average height (h) of the configuration with recesses and projections is 20 μm or less, and it is more preferable for the average particle diameter (A) of the electrically conductive particles to be 10 μm or less, because it is possible to ensure that the average height (h) of the configuration with recesses and projections is 10 μm or less.

And the cell of this embodiment is a cell that includes the electrode for a cell according to the embodiment of the present invention described above.

With this type of a cell, it is possible effectively to increase contact locations between the electrically conductive layer and the electrode active material particles in the electrode active material layer, so that it is possible to reduce the contact resistance between the resin current collector and the electrode active material layer. As a result, it is possible to reduce the internal resistance of the cell.

In the following description, the electrode for a cell and the cell according to an embodiment of the present invention will be explained in detail by citing an example of a bipolar type lithium ion secondary cell and by referring to the appended drawings. It should be understood that the ratios of dimensions shown in the drawings referred to below are exaggerated for convenience of explanation, and in some cases may be different from the actual ratios.

Figure 2:
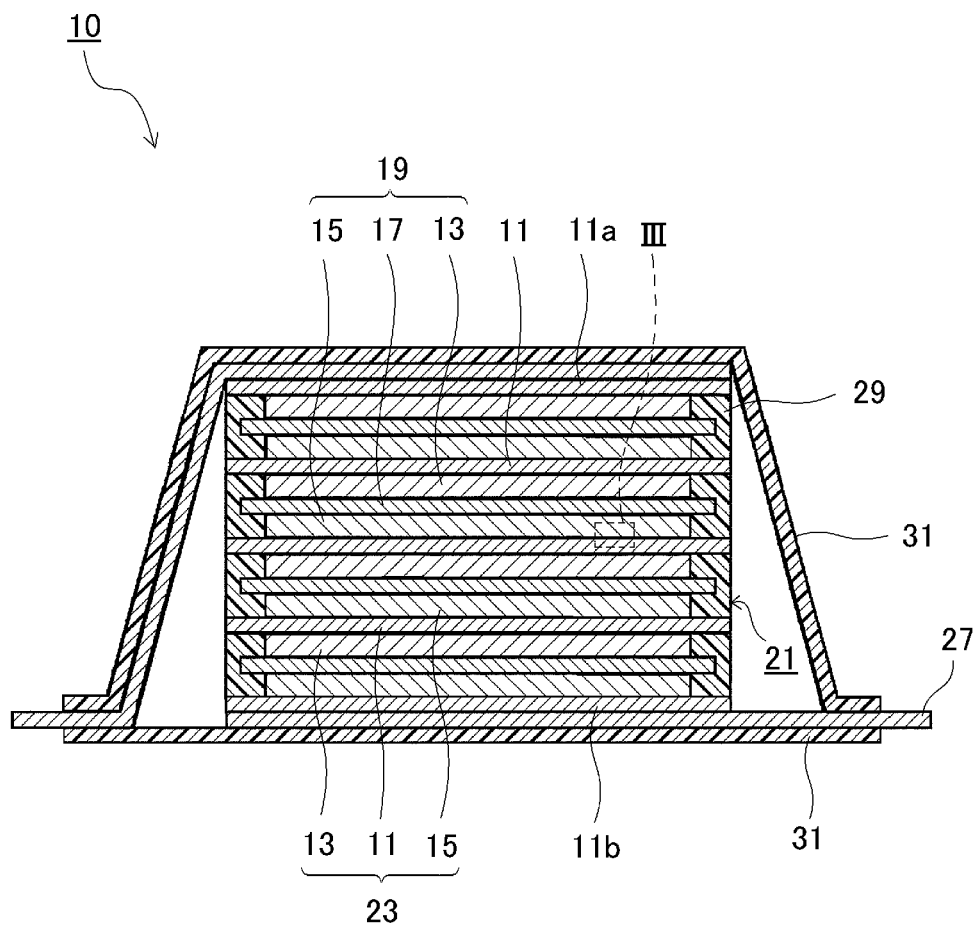
FIG. 2 is a schematic cross-sectional view of this cell, taken along line II-II in FIG. 1.

FIG. 1 is a schematic perspective view illustrating the external appearance of a bipolar type lithium ion secondary cell which is an example of a cell according to an embodiment of the present invention. Moreover, FIG. 2 is a schematic cross-sectional view of this bipolar type lithium ion secondary cell, taken along line II-II in FIG. 1. And FIG. 3 is an enlarged view, schematically illustrating a portion of an electrode for a bipolar type lithium ion secondary cell shown in FIG. 2 as surrounded by line III.

Figure 3:
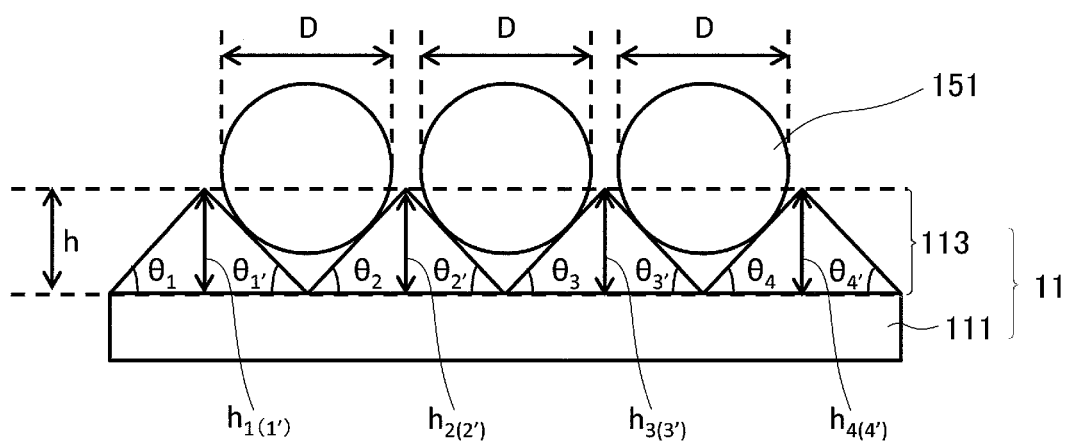
FIG. 3 is an enlarged view, schematically illustrating a portion of an electrode for this cell shown as surrounded by line III in FIG. 2.

As shown in FIG. 1 to FIG. 3, the bipolar type lithium ion secondary cell 10 of this embodiment has a structure in which a substantially rectangular power generation element 21 within which the actual charging and discharging reactions take place is sealed within the interior of an outer casing 31 that is made from laminated film.

And this power generation element 21 of the bipolar type lithium ion secondary cell 10 comprises bipolar type electrodes 23, in which a positive electrode active material layer 13 is formed on one surface side of a current collector 11 and is electrically coupled thereto, and a negative electrode active material layer 15 is formed on the other surface side of the current collector 11 and is electrically coupled thereto. It should be understood that the positive electrode active material layer and the negative electrode active material layer are specific examples of electrode active material layers. The bipolar type electrodes 23 are stacked together with the interposition of electrolyte layers 17, so as to constitute the power generation element 21. The electrolyte layer 17 has a structure, in which electrolyte is retained in the central portion in the in-plane direction of a separator that serves as a substrate material. At this time, the bipolar type electrodes 23 and the electrode layers 17 are laminated together alternately, so that the positive electrode active material layer 13 of one of the bipolar type electrodes 13 and the negative electrode active material layer 15 of another bipolar type electrode 23 that is adjacent to that one bipolar type electrode 23 confront one another via an electrode layer 17. In other words, the electrolyte layer 17 is arranged so that it is sandwiched between the positive electrode active material layer 13 of one of the bipolar type electrodes 23 and the negative electrode active material layer 15 of another bipolar type electrode 23 that is adjacent to that one bipolar type electrode 23.

Furthermore, the bipolar type electrode 23 comprises a resin current collector 111 that is planate, a positive electrode active material layer 13 that is disposed on a surface of the resin current collector 111 on one side thereof, and a negative electrode active material layer 15 that is disposed on the surface of the resin current collector 111 on the other side thereof. And the resin current collector 111 includes an electrically conductive layer 113, having configuration with recesses and projections on its side toward the positive electrode active material layer 13 and toward the negative electrode active material layer 15. Moreover, the negative electrode active material layer 15 contains negative electrode active material particles 151. It should be understood that these negative electrode active material particles are an example of electrode active material particles; it would also be acceptable for the electrode active material particles to be positive electrode active material particles. In other words, although the negative electrode active material layer side is shown in the figure, it goes without saying that this is not to be considered as being limitative. To put this in another manner, it would also be acceptable to provide a similar structure for the positive electrode active material layer side. Although this feature is not illustrated in the figures, the resin current collector contains both a resin and an electrically conductive filler.

Yet further, the configuration with recesses and projections of the electrically conductive layer 113 satisfies the relationship expressed by Formula (1): h/tan θ<D (where h is the average height of the configuration with recesses and projections, θ is the average inclination angle of the configuration with recesses and projections, and D is the average particle diameter of the negative electrode active material particles). It should be understood that, while in the figure the heights of the configuration with recesses and projections, the inclination angles of the configuration with recesses and projections, and the particle diameters of the negative electrode active material particles are all shown as being the same as one another, it goes without saying that this is not to be considered as being limitative. In other words, it would also be acceptable for the heights of the configuration with recesses and projections, the inclination angles of the configuration with recesses and projections, and the particle diameters of the negative electrode active material particles to be different from one another. Moreover, in the example shown in the figure, the average height (h) of the configuration with recesses and projections may be calculated according to $(h_1+h_2+h_3+h_4)/4$. And, in the example shown in the figure, the average inclination angle (θ) of the configuration with recesses and projections may be calculated according to $(\theta_1+\theta_{1'}+\theta_2+\theta_{2'}+\theta_3+\theta_{3'}+\theta_4+\theta_{4'})/8$.

Even further, a positive electrode active material layer 13, an electrolyte layer 17, and a negative electrode active material layer 15 that are mutually adjacent to one another constitute one single cell layer 19. Accordingly, the bipolar type lithium ion secondary cell 10 may also be said to have a structure consisting of the single cell layers 19 laminated together. Furthermore, sealing parts (i.e. insulating layers) 29 are disposed around the external peripheral portions of the single cell layers 19. Due to this, oozing due to leakage of electrolytic solution from the electrolyte layers 17 is prevented, contacting between adjacent current collectors 11 within the cell is prevented, and the occurrence of short circuiting originating in slight unevenness of the end portions of the single cell layers 19 in the power generation element 21 is prevented. In the outermost layer current collector 11a that is positioned in the outermost layer of the power generation element 21 on the positive electrode side, a positive electrode active material layer 13 is formed only on one side. Moreover, in the outermost layer current collector 11b that is positioned in the outermost layer of the power generation element 21 on the negative electrode side, a negative electrode active material layer 15 is formed only on one side.

Furthermore, in this bipolar type lithium ion secondary cell 10, a positive electrode current collection plate 25 is disposed so as to be adjacent to the outermost layer current collector 11a on the positive electrode side, and this collection plate 25 is extended so as to be led out from the outer casing 31 that is formed from laminated film. On the other hand, a negative electrode current collection plate 27 is disposed so as to be adjacent to the outermost layer current collector 11b on the negative electrode side, and, in a similar manner, this collection plate 27 is extended so as to be led out from the outer casing 31.

The number of the single cell layers 19 that are laminated together is adjusted according to the desired voltage. Moreover, in this bipolar type lithium ion secondary cell 10, it would also be possible to reduce the number of the single cell layers 19 that are laminated together, so long as sufficient output can be ensured even though the thickness of the cell is made as thin as possible. Even in the case of this bipolar type lithium ion secondary cell 10, in order to prevent shock from the exterior and environmental deterioration during use, it is preferred to enclose the power generation element 21 under reduced pressure in outer casings 31 that is formed with laminated film, and to provide a construction that leads out the positive electrode current collection plate 25 and the negative electrode current collection plate 27 to the exterior of these outer casings.

In the following, the main structural elements of the bipolar type lithium ion secondary cell of this embodiment will be explained.

Current Collector

The current collector 11 includes a resin current collector 111 being planate and containing a resin and an electrically conductive filler. And, the resin current collector 111 includes an electrically conductive layer 113, which has configuration with recesses and projections on the surface side toward the positive electrode active material layer 13 (or toward the negative electrode active material layer 15), and preferably contains electrically conductive particles. And this configuration with recesses and projections satisfies the relationship expressed by Formula (1): $h/\tan\theta < D$ (where h is the average height of the configuration with recesses and projections, $\theta$ is the average inclination angle of the configuration with recesses and projections, and D is the average particle diameter of the positive electrode (or negative electrode) active material particles in the positive electrode (or negative electrode) active material layer). Moreover, it is preferable for the average height (h) of the configuration with recesses and projections to be 0.1 μm or greater and 20 μm or less, and it is more preferable for it to be 1 μm or greater and 10 μm or less.

Examples of the resin contained in the resin current collector 111 are an electrically conductive polymer material or a non-electrically conductive polymer material. Examples of such a conductive polymer material are polyaniline, polypyrrole, polythiophene, polyacetylene, polyparaphenylene, polyphenylenevinylene, polyoxadiazole, and so on. Moreover, examples of such a non-electrically conductive polymer material are polyethylene (PE: high density polyethylene (HDPE), low density polyethylene (LDPE), etc.), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), and so on.

Moreover, material that can be employed as the electrically conductive filler contained in the resin current collector 111 is not particularly limited, so long as it is a substance that is electrically conductive. For example, metals or electrically conductive carbon or the like may be suggested as material that have excellent electrical conductivity, voltage resistance, and lithium ion barrier properties. The metal is not particularly limited; however it is preferred for at least one metal selected from the group consisting of Ni, Ti, Al, Cu, Pt, Fe, Cr, Sn, Zn, In and Sb, or an alloy including these metals, or a metallic oxide, to be included. Moreover, the electrically conductive carbon is not particularly limited. Preferably, at least one material selected from the group consisting of acetylene black, Vulcan, black pearl, carbon nanofibers, Ketjen black, carbon nanotubes, carbon nanohorns, and carbon nanoballoons is included. The amount of the electrically conductive filler that is included is not particularly limited, so long as it is an amount that is capable of imparting sufficient electrical conductivity to the current collector; this amount is generally around 5% to 35% mass %.

Furthermore, the electrically conductive layer 113 is not particularly limited, so long as, by the above described configuration with recesses and projections being formed, it is possible to reduce the contact resistance. For example, it is preferred for the electrically conductive layer 113 to contain electrically conductive particles. Moreover, for example, epoxy resin or the like may be employed for fixing these electrically conductive particles. And the material that is employed for the electrically conductive particles is not particularly limited, so long as it is a substance that is electrically conductive. For example, a metal or electrically conductive carbon or the like may be suggested as a material that is excellent in electrical conductivity and electrolytic resistance. The metal is not particularly limited. However, it is preferred for at least one metal selected from the group consisting of Ni, Ti, Al, Cu, Pt, Fe, Cr, Sn, Zn, In and Sb, or an alloy including these metals, or a metallic oxide, to be included. Moreover, the electrically conductive carbon is not particularly limited. Preferably, at least one material selected from the group consisting of acetylene black, Vulcan, black pearl, carbon nanofibers, Ketjen black, carbon nanotubes, carbon nanohorns and carbon nanoballoons is included. And it is preferable for the electrically conductive particles to satisfy the relationship expressed by Formula (2): $A < D$ (in this formula, A is the average particle diameter of the electrically conductive particles, and D is the average particle diameter of the positive electrode (or negative electrode) active material particles). Moreover, in particular, it is preferable for the average particle diameter (A) of the electrically conductive particles to be 20 μm or less, and it is more preferable for it to be 10 μm or less. Furthermore, the resin is not limited to the above mentioned epoxy resin, and, for example, an electrically conductive polymer material such as polyaniline, polypyrrole, polythiophene, polyacetylene, polyparaphenylene, polyphenylene vinylene, polyoxadiazole, or the like may be employed. Yet further, a non-conductive polymer material such as, for example, polyethylene (PE: high density polyethylene (HDPE), low density polyethylene (LDPE), etc.), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), or the like may also be employed.

The configuration with recesses and projections of the electrically conductive layer described above may, for example, be formed by applying a coating ink including electrically conductive particles whose average particle diameter (A) satisfies the relationship D>A onto the resin current collector, which is planate, and by drying that ink; however this is not intended to be limitative. For example, in order to reduce the average height (h) of the configuration with recesses and projections, it is preferable to reduce the average particle diameter (A) of the electrically conductive particles, and/or to reduce the proportion thereof contained in the coating ink, and/or to reduce the viscosity of the ink, and/or to lengthen the drying time; while, to increase the average height (h) of the configuration with recesses and projections, it is preferable to increase the average particle diameter (A) of the electrically conductive particles, and/or to increase the proportion thereof contained in the coating ink, and/or to increase the viscosity of the ink, and/or to shorten the drying time. Furthermore, the above described configuration with recesses and projections of the electrically conductive layer may be formed, for example, by forming the electrically conductive layer, which forms the above described configuration with recesses and projections, upon a substrate, and then by transferring this configuration onto the resin current collector that is planate. Yet further, the above described configuration with recesses and projections of the electrically conductive layer may be formed, for example, by applying a coating ink including electrically conductive particles upon the resin current collector, and, after drying, by hot pressing with a die which forms the above described configuration with recesses and projections. Among these methods, from the standpoint of convenience of working, i.e. from the standpoint of being able to form the electrically conductive layer having the configuration with recesses and projections by employing a low number of steps, it is preferred to form the configuration with recesses and projections of the electrically conductive layer by applying a coating ink including electrically conductive particles of average particle diameter (A) satisfying the relationship D>A upon the resin current collector, and by drying that ink.

Positive Electrode Active Material Layer

The positive electrode active material layer 13 includes positive electrode active material particles, and, according to requirements, may include components conventionally known for inclusion in the positive electrode of a lithium ion secondary cell, such as a gel plasticity polymer, a binder, a conductive additive, an ion conductive polymer, a lithium salt, or the like. For example, it is preferred to employ a metallic oxide as the positive electrode active material. Generally, if the positive electrode active material is made from a metallic oxide, this is practical from the standpoint of the cell characteristics (such as capacity). However, when a metallic oxide is employed as the active material, then it may happen that, since the affinity of this metallic oxide is not high for a gel forming polymer that constitutes a shell portion of a core-shell type electrode material, which, as described in detail hereinafter, is the preferred form, sufficient adhesive force may not be obtained. By contrast, it is possible to enhance the adhesion of a gel forming polymer to the positive electrode active material by coating the surface of the positive electrode active material with a first electrically conductive material that will be described in detail hereinafter. Accordingly, from the standpoint of being able to prominently manifest the beneficial effects due to the employment of the first electrically conductive material, it is preferable to employ a metallic oxide as the positive electrode active material.

Preferred metallic oxides to be employed for the positive electrode active material include, for example, lithium-transition metal complex oxides such as $LiMnO_4$, $LiCoO_2$, $LiNiO_2$, $LiFeO_2$, $Li_4Ti_5O_{12}$, $Li(Ni—Mn—Co)O_2$ and ones in which a portion of these transition metals has been replaced by other element or the like, or lithium-transition metal phosphate compounds such as $LiFePO_4$ or the like, or lithium-transition metal sulfate compounds, and so on. According to circumstances, it would also be acceptable to employ two or more positive electrode active materials in combination. From the standpoint of capacity and output characteristics, a lithium-transition metal complex oxide or a lithium-transition metal phosphate compound is preferably employed as the positive electrode active material. More preferably, a complex oxide containing lithium and nickel is employed, and yet more preferably $Li(Ni—Mn—Co)O_2$ or a compound in which a portion of those transition metals has been replaced by other element (hereinafter simply termed a "NMC complex oxide") is employed. An NMC complex oxide has a layered crystalline structure in which layers of lithium atoms and layers of transition metal atoms (in which Mn, Ni, and Co are arranged in an ordered configuration) are stacked alternately with the interposition of layers of oxygen atoms, and includes one Li atom per each one atom of the transition metal M, and the amount of Li extracted is twice the amount of spinel group lithium manganese oxide, in other words the supply capacity is doubled, so that it is possible to have high capacity.

As described above, a NMC complex oxide includes a complex oxide in which a portion of a transition metal element is replaced by other metal element. In this case, this other element is Ti, Zr, Nb, W, P, Al, Mg, V, Ca, Sr, Cr, Fe, B, Ga, In, Si, Mo, Y, Sn, V, Cu, Ag, Zn or the like, and preferably Ti, Zr, Nb, W, P, Al, Mg, V, Ca, Sr, or Cr; and more preferably Ti, Zr, P, Al, Mg, or Cr; and, from the standpoint of enhancing the cycling characteristics, even more preferably Ti, Zr, Al, Mg, or Cr.

Since the theoretical discharge capacity of a NMC composite oxide is high, preferably, it has a composition given by the general formula (1): $Li_aNi_bMn_cCo_dM_xO_2$ (In this formula, a, b, c, d and x satisfy $0.9 \leq a \leq 1.2$, $0<b<1$, $0<c\leq 0.5$, $0<d\leq 0.5$, $0 \leq x \leq 0.3$, and $b+c+d=1$. M is at least one element selected from Ti, Zr, Nb, W, P, Al, Mg, V, Ca, Sr, and Cr.). Here, a is the atomic ratio of Li, b is the atomic ratio of Ni, c is the atomic ratio of Co, d is the atomic ratio of Mn, and X is the atomic ratio of M. From the standpoint of cycling characteristics, b preferably satisfies $0.4 \leq b \leq 0.6$ in the general formula (1). The composition of each element can, for example, be measured by an inductively coupled plasma (ICP) light emission analysis method.

In general, from the viewpoint of enhancing material purity and electronic conductivity, it is conventionally known that nickel (Ni), cobalt (Co), and manganese (Mn) contribute to the capacity and the output characteristics. Ti and so on are included for partially replacing the transition metal in the crystal lattice.

As a preferred form, from the standpoint of enhancing the balance between the capacity and the lifetime performance, it is preferable for b, c and d in the general formula (1) to satisfy $0.49 \leq b \leq 0.51$, $0.29 \leq c \leq 0.31$, and $0.19 \leq d \leq 0.21$. For example, compared with $LiCoO_2$, $LiMn_2O_4$, $LiNi_{1/3}Mn_{1/3}Co_{1/3}O_2$ or the like, which is employed in a general cell for consumer use, $LiNi_{0.5}Mn_{0.3}Co_{0.2}O_2$ has the advantageous aspect that a cell that is compact and has high capacity can be manufactured, because the specific energy density can be improved due to the large capacity per unit mass. This is also preferable from the point of view of cruising distance. While $LiNi_{0.8}Co_{0.1}Al_{0.1}O_2$ is advantageous from the point of view that the capacity is larger, the life characteristics are not excellent. By contrast, life characteristics of $LiNi_{0.5}Mn_{0.3}Co_{0.2}O_2$ is as excellent as that of $LiNi_{1/3}Mn_{1/3}Co_{1/3}O_2$.

It should be understood that it would, of course, also be acceptable to employ other positive electrode active material than that described above. Moreover, while the average particle diameter of the positive electrode active material (in case of a core-shell type electrode material described hereinafter, a part of the core portion excluding the first electrically conductive material) that is included in the positive electrode active material layer is not particularly limited, from the standpoint of increasing the cell output, it is preferably 0.1 to 100 µm, and more preferably is 1 to 20 µm. In case that the positive electrode active material particles are a core-shell type electrode material, then, from the standpoint of reducing the contact resistance, it is preferable for the average particle diameter of the positive electrode active material particles which are the core-shell type electrode material to be 1 to 20 µm.

Moreover, it is preferred for the positive electrode active material to be included in the positive electrode active material layer 13 in the form of a core-shell type electrode material (a core-shell type positive electrode material).

The core-shell type positive electrode material is constituted from a core portion in which at least a part of the surface of the positive electrode active material is coated by a first electrically conductive material, and a shell portion that coats the surface of this core portion.

And this core portion has a structure in which a metal oxide (for example $LiCoO_2$) that is the positive electrode active material is coated with a carbon material, which is an example of a first electrically conductive material. It should be understood that the entire surface of the positive electrode active material may be coated with the first electrically conductive material, or, alternatively, a part of the surface of the positive electrode active material may be left exposed, so that it can contact directly with a substrate (to be described in detail hereinafter).

Furthermore, the shell portion has a structure in which acetylene black, which is an example of a second electrically conductive material, is included within a substrate that is made from a gel forming polymer. It should be understood that the entire surface of the core portion may be covered with the shell portion, or, alternatively, a part of the surface of the core portion may be left exposed.

Moreover, although the mass ratio of the shell portion with respect to the core portion is not particularly limited, it is preferable for the shell portion to be 0.1 to 20 parts by mass with respect to 100 parts by mass of the core portion, and it is more preferable for it to be 0.5 to 5 parts by mass.

In the following, an example of a case in which a core-shell type electrode material is employed as the positive electrode material will be described, and the details of the core portion and the shell portion will be explained. However, as described hereinafter, it would also be possible to apply such a core-shell type electrode material as the negative electrode material.

The core portion includes the positive electrode active material and the first electrically conductive material. Moreover, the surface of the positive electrode active material is coated with (carried by) the first electrically conductive material.

In this specification, "coat" or "carry" means that the first electrically conductive material is chemically or physically coupled to at least a part of the surface of the electrode active material. Moreover, that the surface of the electrode active material is coated with the first electrically conductive material may be confirmed by, with a conventionally known means such as a scanning electron microscope or the like, observing the manufactured electrode active material, or the electrode active material collected (separated) from the electrode. In other words, this can be confirmed by observing, upon a scanning electron microscopic image or the like, the first electrically conductive material in a state it is adhered to the active material particles.

Here, the coverage (carrying ratio) of the positive electrode active material by the first electrically conductive material is not particularly limited. However, when consideration is given to the cell characteristics and the effect of improving the electrical conductivity and so on, the coverage (carrying ratio) of the positive electrode active material by the first electrically conductive material is preferably 20% or greater by area, and more preferably is 50% or greater by area, and yet more preferably is 75% or greater by area (the upper limit being 100% by area).

In this specification, a value measured and calculated by Auger electron spectroscopy is employed as "coverage (carrying ratio) of the active material by the electrically conductive material".

In the following, the positive electrode active material and the first electrically conductive material, which constitute the core portion will be explained respectively.

It is possible for the first electrically conductive material that is coated upon the positive electrode active material to cover at least a part of the surface of the positive electrode active material, and any material will be employed, so long as it is electrically conductive. In other words, any material may be employed as the first electrically conductive material, so long as it is capable of forming an electrically conductive path between the core portion and the surface of the electrode material (i.e. the outer surface of its shell portion).

For example, a carbon material, an electrically conductive metal oxide, a metal, an electrically conductive ceramic, an electrically conductive polymer, or the like may be suggested as the first electrically conductive material.

Of the materials described above, a carbon material is preferred for the first electrically conductive material. Due to affinity between the gel forming polymer from which the shell portion is constituted and the carbon material, it is possible for the positive electrode active material firmly to hold the substrate that is made from the gel forming polymer, via the carbon material. In other words, the core portion and the shell portion are solidly bonded together. Accordingly, it is possible to provide an electrode material that is structurally stable. Moreover, even if the electrical conductivity of the positive electrode active material itself is low, it is still possible to enhance the electrical conductivity of the core portion by covering the positive electrode active material with the carbon material, due to the electrical conductivity of the carbon material.

The carbon material will now be explained in the following.

The carbon material that is employed as the first electrically conductive material is not particularly limited, and any carbon material may be employed, so long as it is capable of coating at least a part of the surface of the positive electrode active material. For example, the carbon material that is employed may be the same as that employed as a conductive additive (i.e. an additive that is blended in order to enhance the electrical conductivity of the electrode active material layer).

Specifically, acetylene black, furnace black, carbon black, channel black, graphite or the like may be suggested. Among these, from the standpoint of maintaining the coverage of the carbon material by suppressing the insertion and desorption of Li ions, it is preferable to employ a carbon material that has a low crystallinity, and it is more preferable to employ acetylene black.

The form of the carbon material (i.e. its form in the state in which it is coated upon the active material) is also not particularly limited; and the carbon material may be in particle form or in fiber form. From the standpoint of ease of coating, the particle form is preferable; however, from the standpoint of electrical conductivity, the fiber form is preferable. Moreover, the size of the carbon material is not particularly limited. For example, in case the carbon material is in particle form, then its average particle diameter (i.e. the secondary particle diameter) is preferably 10 to 200 nm, and more preferably is 20 to 150 nm. Furthermore, in case the carbon material is in fiber form, then its diameter is preferably 20 to 500 nm, and more preferably is 50 to 300 nm, and its length is preferably 5 to 20 μm, and more preferably is 8 to 15 μm. With this sort of size, the carbon material can be simply and easily coated upon the surface of the active material. Moreover, with this sort of size, the carbon material can easily be coated uniformly upon the surface of the active material.

As described above, the shell portion has a structure in which a second electrically conductive material (here, acetylene black) is included in the substrate that is made from a gel forming polymer. In case an electrolyte material that is included in an electrolyte layer that will be described hereinafter includes an electrolyte solution (in other words, in case the electrolyte is a liquid electrolyte or a gel electrolyte), then, usually, the electrolyte solution derived from electrolyte material included in the electrolyte layer permeates into the positive electrode active material layer 13. Due to this, the substrate (i.e. the gel forming polymer) constituting the shell portion absorbs the electrolyte solution and swells, and goes into the gel state.

Vinyl resin, urethane resin, polyester resin, polyamide resin, epoxy resin, polyimide resin, silicone resin, phenol resin, melamine resin, urea resin, aniline resin, ionomer resin or polycarbonate resin or the like may be employed as material constituting the substrate. One of these may be employed alone, or a mixture of two or more of them may be employed. Moreover, as vinyl resin, so-called acrylic resin whose essential structural monomer is, for example, methyl (meth)acrylate, ethyl (meth)acrylate, or butyl (meth) acrylate is preferred. Furthermore, it is preferable for the tensile elongation at break of the gel forming polymer in the gel state to be 10% or greater.

Moreover, it is desirable for the vinyl resin to include a polymer that contains a vinyl monomer as an essential constituent monomer. Since a polymer that contains a vinyl monomer as an essential constituent monomer has flexibility. Accordingly it mitigates change of volume of the electrode by coating the electrode active material with this polymer, so that it is possible to suppress expansion of the electrode.

In particular, a desirable vinyl monomer includes a vinyl monomer having a carboxyl group and a vinyl monomer expressed by the general formula (2): $CH_2=C(R^1)COOR^2$ (in this formula, $R^1$ is a hydrogen atom or a methyl group, and $R^2$ is a branched alkyl group having 4 to 36 carbon atoms).

(Meth)acrylic acid, crotonic acid, monocarboxylic acid having 3 to 15 carbon atoms such as cinnamic acid, (anhydrous) maleic acid, fumaric acid, (anhydrous) itaconic acid, citraconic acid, dicarboxylic acid having 4 to 24 carbon atoms such as mesaconic acid, 3- to 4-valent or more than 4-valent polycarboxylic acid having 6 to 24 carbon atoms such as aconitic acid, and so on may be suggested as the vinyl monomer having a carboxyl group. Among these, (meth)acrylic acid is preferred, and in particular methacrylic acid is preferred.

In the vinyl monomer represented by the general formula (2) described above, $R^1$ represents a hydrogen atom or a methyl group. Preferably $R^1$ is a methyl group. $R^2$ is a branched alkyl group having 4 to 36 carbon atoms, and specific examples of $R^2$ that may be suggested are a 1-alkylalkyl group (a 1-methylpropyl group (a sec-butyl group), a 1,1-dimethylethyl group (a tert-butyl group), a 1-methylbutyl group, a 1-ethylpropyl group, a 1,1-dimethylpropyl group, a 1-methylpentyl group, a 1-ethylbutyl group, a 1-methylhexyl group, a 1-ethylpentyl group, a 1-methylheptyl group, a 1-ethylhexyl group, a 1-methyloctyl group, a 1-ethylheptyl group, a 1-methylnonyl group, a 1-ethyloctyl group, a 1-methyldecyl group, a 1-ethylnonyl group, a 1-butyleicosyl group, a 1-hexyloctadecyl group, a 1-octylhexadecyl group, a 1-decyltetradecyl group, a 1-undecyltridecyl group, or the like), or a 2-alkylalkyl group (a 2-methylpropyl group (an iso-butyl group), a 2-methylbutyl group, a 2-ethylpropyl group, a 2,2-dimethylpropyl group, a 2-methylpentyl group, a 2-ethylbutyl group, a 2-methylhexyl group, a 2-ethylpentyl group, a 2-methylheptyl group, a 2-ethylhexyl group, a 2-methyloctyl group, a 2-ethylheptyl group, a 2-methylnonyl group, a 2-ethyloctyl group, a 2-methyldecyl group, a 2-ethylnonyl group, a 2-hexyloctadecyl group, a 2-octylhexadecyl group, a 2-decyltetradecyl group, a 2-undecyltridecyl group, a 2-dodecylhexadecyl group, a 2-tridecylpendadecyl group, a 2-decyloctadecyl group, a 2-tetradecyloctadecyl group, a 2-hexadecyloctadecyl group, a 2-tetradecyleicosyl group, a 2-hexadecyleicosyl group, or the like), or a 3 to 34-alkylalkyl group (a 3-alkylalkyl group, a 4-alkylalkyl group, a 5-alkylalkyl group, a 32-alkylalkyl group, a 33-alkylalkyl group, a 34-alkylalkyl group, or the like), as well as a mixed alkyl group containing one or more branched alkyl groups such as an alkyl residue of an oxo-alcohol, corresponding to a propylene oligomer (a 7 to 11-mer), an ethylene/propylene oligomer (molar ratio 16/1 to 1/11), an isobutylene oligomer (a 7 to 8-mer), or an α-olefin oligomer (5 to 20 carbon atoms) (a 4 to 8-mer), or the like. Among these, from the standpoint of absorbing a liquid electrolyte, a 2-alkylalkyl group is preferred, and a 2-ethylhexyl group and a 2-decyltetradecyl group are more preferred.

Moreover, in the monomer constituting the polymer, besides a vinyl monomer and the vinyl monomers described by the general formula (2) above, it would also be possible to include a co-polymerizable vinyl monomer containing no active hydrogen.

As the co-polymerizable vinyl monomers not containing any active hydrogen, (1) to (5) below may be suggested.

(1) Carbyl (meth)acrylates formed from a monool having 1 to 20 carbon atoms and (meth)acrylic acid. Examples of the monool mentioned above that may be suggested are: (i) alphatic monools [methanol, ethanol, n- and i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, stearyl alcohol, and so on], (ii) alicyclic monools [cyclohexyl alcohol and so on], (iii) araaliphatic monools [benzyl alcohol and so on], and a mixture of two or more of these.

(2) Poly-(n=2 to 30) oxyalkylene (2 to 4 carbon atoms) alkyl (1 to 18 carbon atoms) ether (meth)acrylate [ethylene oxide 10 mol adduct (hereinafter abbreviated as "EO") (meth)acrylate of methanol, propylene oxide 10 mol adduct (hereinafter abbreviated as "PO") (meth)acrylate of methanol, or the like].

(3) Vinyl compounds containing nitrogen.

(3-1) Vinyl compounds containing an amide group.

(i) (Meth)acrylamide compounds having 3 to 30 carbon atoms, for example, N,N-dialkyl (1 to 6 carbon atoms) or diaralkyl (7 to 15 carbon atoms) (meth)acrylamide [N,N-dimethylacrylamide, N,N-dimethylacrylamide], diacetone acrylamide.

(ii) Other vinyl compounds containing an amide group having 4 to 20 carbon atoms than the (meth)acrylic amide compounds mentioned above, for example, N-methyl-N-vinyl acetamide or cyclic amides (pyrrolidone compounds (6 to 13 carbon atoms, for example N-vinyl pyrrolidone or the like)).

(3-2) (Meth)acrylate compounds.

(i) Dialkyl (1 to 4 carbon atoms) amino alkyl (1 to 4 carbon atoms) (meth)acrylates [N,N-dimethylaminoethyl (meth) acrylate, N,N-diethylaminoethyl (meth)acrylate, t-butylaminoethyl (meth)acrylate, morpholineethyl (meth)acrylate, or the like).

(ii) (Meth)acrylates containing a quaternary ammonium group [quaternarized (meth)acrylate containing a tertiary amino group (i.e. compounds quaternarized by using the above mentioned quaternarizing agents) [N,N-dimethylaminoethyl (meth) acrylate, N,N-diethylaminoethyl (meth) acrylate or the like] or the like.]

(3-3) Vinyl compounds containing a heterocyclic ring.

Pyridine compounds (7 to 14 carbon atoms, for example 2- and 4-vinyl pyridine), imidazole compounds (5 to 12 carbon atoms, for example N-vinyl imidazole), pyrrole compounds (6 to 13 carbon atoms, for example N-vinyl pyrrole), and pyrrolidone compounds (6 to 13 carbon atoms, for example N-vinyl-2-pyrrolidone).

(3-4) Vinyl compounds containing a nitrile group

Vinyl compounds with 3 to 15 carbon atoms containing a nitrile group, for example (meth)acrylonitrile, cyanostyrene, and cyanoalkyl (1 to 4 carbon atoms) acrylate.

(3-5) Other vinyl compounds

Vinyl compounds containing a nitro group (8 to 16 carbon atoms, for example nitrostyrene), or the like.

(4) Vinyl hydrocarbons (4-1) Aliphatic vinyl hydrocarbons

Olefins having 2 to 18 or more carbon atoms [ethylene, propylene, butene, isobutylene, pentene, heptene, di-isobutylene, octene, dodecene, octadecene, and so on], and dienes having 4 to 10 or more carbon atoms [butadiene, isoprene, 1-4 pentadiene, 1,5-hexadiene, 1,7-octadiene, and so on], or the like.

(4-2) Alicyclic vinyl hydrocarbons

Unsaturated cyclic compounds having 4 to 18 or more carbon atoms, for example cycloalkenes (such as cyclohexene), (di)cycloalkadienes [such as (di)cyclopentadiene], and terpenes (such as pinene, limonene, and indene).

(4-3) Aromatic vinyl hydrocarbons

Unsaturated aromatic compounds having 8 to 20 or more carbon atoms and a derivative thereof, for example styrene, α-methylstyrene, vinyltoluene, 2,4-dimethylstyrene, ethylstyrene, isopropylstyrene, butylstyrene, phenylstyrene, cyclohexylstyrene, benzylstyrene, and lithium styrene sulfonate.

(5) Vinyl esters, vinyl ethers, vinyl ketones, and unsaturated dicarboxylic acid diesters (5-1) Vinyl esters Aliphatic vinyl esters [4 to 15 carbon atoms, for example alkenyl esters of aliphatic carboxylic acids (mono- and di-carboxylic acids) (for example, vinyl acetate, vinyl propionate, vinyl butyrate, diallyl adipate, isopropenyl acetate, and vinyl methoxy acetate).

Aromatic vinyl esters [9 to 20 carbon atoms, for example alkenyl esters of aromatic carboxylic acids (mono- and di-carboxylic acids) (for example, vinyl benzoate, diallyl phthalate, and methyl-4-vinyl benzoate), and esters of aliphatic carboxylic acids containing an aromatic ring (for example, acetoxy styrene).

(5-2) Vinyl ethers

Aliphatic vinyl ethers (3 to 15 carbon atoms, for example vinyl alkyl (1 to 10 carbon atoms) ethers [vinyl methyl ether, vinyl butyl ether, vinyl 2-ethylhexyl ether, or the like], vinylalkoxy (1 to 6 carbon atoms) alkyl (1 to 4 carbon atoms) ethers [vinyl-2-methoxy ethyl ether, methoxybutadiene, 3,4-dihydro-1,2-pyran, 2-butoxy-2'-vinyloxy diethyl ether, vinyl-2-ethylmercapto ethyl ether, or the like], and poly (2 to 4) (meth)allyloxy alkanes (2 to 6 carbon atoms) [diallyloxyethane, triallyloxyethane, tetraallyloxybutane, tetramethallyloxyethane, or the like].

Aromatic vinyl ethers (8 to 20 carbon atoms, for example vinyl phenyl ether or phenoxystyrene).

(5-3) Vinyl ketones

Aliphatic vinyl ketones (4 to 25 carbon atoms, for example vinyl methyl ketone or vinyl ethyl ketone).

Aromatic vinyl ketones (9 to 21 carbon atoms, for example vinyl phenyl ketone).

(5-4) Unsaturated dicarboxylic acid diesters

Unsaturated dicarboxylic diesters having 4 to 34 carbon atoms, for example dialkyl fumarate (two alkyl groups are straight chain, branched chain, or alicyclic groups having 1 to 22 carbon atoms), dialkyl maleates (two alkyl groups are straight chain, branched chain, or alicyclic groups having 1 to 22 carbon atoms.).

From the standpoint of absorption of the electrolytic solution and the voltage resistance, among those exemplified in (3) above, preferred are (3-1), (3-2), (3-3) and (3-4) and more preferred are methyl (meth)acrylate, ethyl (meth) acrylate, and butyl (meth)acrylate in (3-1) and lithium styrene sulfonate in (3-4).

In the polymer, with regard to the content of vinyl monomers having a carboxyl group, the content of vinyl monomers given by the general formula (2) described above, and the content of co-polymerizable vinyl monomers not containing active hydrogen, it is desirable for the content of the vinyl monomers having a carboxyl group to be 0.1 to 80% by mass, it is desirable for the content of the vinyl monomers given by the general formula (2) described above to be 0.1 to 99.9% by mass, and it is desirable for the content of the co-polymerizable vinyl monomers not containing active hydrogen to be 0 to 99.8% by mass.

When the contents of the monomers are within the ranges described above, the performance for absorption of the electrolytic solution becomes satisfactory.

More preferable contents are 30 to 60% by mass for the vinyl monomers having a carboxyl group, 5 to 60% by mass for the vinyl monomers given by the general formula (2) described above and 5 to 80% by mass for the co-polymerizable vinyl monomers not containing active hydrogen; and, even more preferable contents are 35 to 50% by mass for the vinyl monomers having a carboxyl group, 15 to 45% by mass for the vinyl monomers given by the general formula (2) described above and 20 to 60% by mass for the co-polymerizable vinyl monomers not containing active hydrogen.

A preferred lower limit for the number average molecular weight of the polymer is 3,000, more preferably 50,000, yet more preferably 100,000, and most preferably 200,000; and a preferred upper limit therefor is 2,000,000, more preferably 1,500,000, yet more preferably 1,000,000, and most preferably 800,000.

The number average molecular weight of the polymer may be obtained by GPC (gel permeation chromatography) measurement under the following conditions:
Apparatus: Alliance GPC V200 (manufactured by Waters Co. Ltd.).
Solvent: orthodichlorobenzene.
Reference material: polystyrene.
Sample concentration: 3 mg/ml.
Column stationary phase: PL gel 10 µm, two MIXED-B in series (manufactured by Polymer Laboratories Co. Ltd.).
Column temperature: 135° C.

The solubility parameter (i.e. the SP value) of the polymer is preferably 9.0 to 20.0 $(cal/cm^3)^{1/2}$. It is more desirable for the SP value of the polymer (B) to be 9.5 to 18.0 $(cal/cm^3)^{1/2}$, and it is yet more desirable for it to be 9.5 to 14.0 $(cal/cm^3)^{1/2}$. It is desirable for the SP value of the polymer (B) to be 9.5 to 20.0 $(cal/cm^3)^{1/2}$ from the standpoint of absorption of the electrolytic solution.

Furthermore, from the standpoint of heat resistance of the cell, it is preferable for the glass transition temperature of the polymer [hereinafter abbreviated as "Tg", with the method of measurement being DSC (differential scanning calorimetry)] to be 80 to 200° C., more preferably 90 to 180° C., and yet more preferably 100 to 150° C.

In this specification, "tensile elongation at break" is a value indicating the flexibility of the gel forming polymer which is the structural material for the substrate, and this value may be obtained, for example, by a measurement method according to ASTM D683 (test piece shape Type II), after having punched out a piece of the sheet resin of thickness 500 µm in the form of a dumb-bell and having soaked this for three days at 50° C. in electrolytic solution (1 mol/L $LiPF_6$, ethylene carbonate (EC)/propylene carbonate (PC)=50/50 (mass ratio)). The value of the tensile elongation at break of the gel forming polymer should be 10% or greater, preferably 20% or greater, more preferably 30% or greater, even more preferably 40% or greater, and most preferably 50% or greater. The value of the tensile elongation at break of the gel forming polymer is preferably as high as possible.

While the specific type of the second electrically conductive material included in the substrate for the shell portion and the way in which it is contained therein are not particularly limited, it should be arranged for these to be capable of forming an electrically conductive path between the core portion and the surface of the electrode material (i.e. the outer surface of the shell portion). Moreover, while it would be acceptable to employ the same material for the first electrically conductive material and the second electrically conductive material, these are clearly distinguished in the core-shell type positive electrode material. In other words, the material that is coated directly over the surface of the positive electrode active material is the first electrically conductive material, while the material that is dispersed within the shell portion is the second electrically conductive material. In this embodiment, the core portion is manufactured in advance by coating the surface of the positive electrode active material with the first electrically conductive material, and subsequently the shell portion which includes the second electrically conductive material is formed upon the surface of that core portion. In this manner, in the process of manufacturing the core-shell type positive electrode material, the first electrically conductive material and the second electrically conductive material are distinguished from one another from the standpoint of the time point at which they are added.

For example, a carbon material such as Ketchen black, carbon black such as acetylene black or the like, graphite, carbon fiber (for example, vapor-grown carbon fiber (VGCF)); carbon nanotubes (CNT) of various types, or other electrically conductive fibers may be suggested as types for the second electrically conductive material. With regard to the manner in which the second electrically conductive material is contained, in case the electrically conductive material is a material which is able to have a fibrous structure such as acetylene black or carbon fiber, then it is preferable for the surface of the electrode active material constituting the core portion or the surface of the first electrically conductive material and the surface of the electrode material (i.e. the outer surface of the shell portion) to be electrically connected together via the second electrically conductive material.

While the ratio of the amounts of the substrate and the second electrically conductive material included in the shell portion is not particularly limited, as an example, the content of the second electrically conducive material is preferably 10 to 400 parts by mass, and more preferably is 25 to 150 parts by mass per 100 parts by mass of the substrate.

When the content of the electrically conductive material is greater than or equal to 10 parts by mass, then it becomes possible to form a path that is sufficiently electrically conductive, so that it becomes possible to reduce (or to prevent increase) of the internal resistance of the cell. On the other hand, it is preferable for the content of the electrically conductive material to be less than or equal to 400 parts per mass, from the point of view of stability of the shell layer. It should be understood that the values of these ratios for the contents are calculated as averages of values that have been measured for 50 or more samples of the core-shell type electrode active material.

As described above, by the surface of the core portion being coated by the shell portion, it is possible to obtain the effect of reducing (or preventing increase) of the internal resistance of the cell.

Although a specific embodiment of the core-shell type positive electrode material that is included in the positive electrode active material layer 13 has been explained above, it would also be possible for the positive electrode active material layer 13 to include a positive electrode active material other than the core-shell type positive electrode material described above (for example, a material that is similar to conventionally used material).

For the binder, a solvent based binder such as polyvinylidene fluoride (PVdF) or an acrylic resin or the like, or an aqueous binder, may be suggested.

It is preferable for at least an aqueous binder to be included in the electrode active material layer. With an aqueous binder, the binding force is high. Moreover, in addition to the fact that procurement of water as a raw material is easy, also, since it is water vapor that is generated, when drying, accordingly there are the beneficial aspects that it is possible greatly to reduce the capital investment in the manufacturing line, and also that it is possible to anticipate reduction of the environmental burden. Furthermore, when an aqueous binder is employed as the binder to be included in the active material layer of this embodiment, then, although water is used as the solvent for preparation of the active material slurry that is prepared when coating the active material layer, in this case, even if the core-shell type electrode material is added to the active material slurry, the possibility is small that the gel forming material constituting that electrode material dissolves in the water as the solvent for preparation. Due to this, it is possible to employ the electrode material in a stable manner, and moreover there is the beneficial aspect that, during manufacture of the electrode material, it is possible to employ a gel forming polymer that is capable of forming a physically cross-linked gel.

"Aqueous binder" refers to a binder that employs water as a solvent or as a dispersion medium, and in particular corresponds to a thermoplastic resin, a polymer having rubber-like elasticity, a water soluble polymer, or the like, or a mixture thereof. Here, "binder that employs water as a dispersion medium" includes everything that can be described as a latex or an emulsion, and refers to a polymer that is emulsified with water or suspended in water; for example, polymer latexes that are emulsion polymerized in a self-emulsification system, may be suggested.

As the aqueous binder, specifically, styrene based polymers (styrene-butadiene rubber, styrene-vinyl acetate copolymer, styrene-acrylic copolymer, or the like), acrylonitrile-butadiene rubber, methyl methacrylate-butadiene rubber, (meth)acrylic based polymers (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethyl hexyl acrylate, polyethylhexyl methacrylate, polylauryl acrylate, polylauryl methacrylate, or the like), polytetrafluoroethylene, polyethylene, polypropylene, ethylene-propylene copolymer, polybutadiene, butyl rubber, fluorine rubber, polyethylene oxide, polyepichlorohydrin, polyphosphazene, polyacrylonitrile, polystyrene, ethylene-propylene-diene copolymer, polyvinyl pyridine, chlorosulfonated polyethylene, polyester resin, phenol resin, epoxy resin, polyvinyl alcohol (the average polymerization degree is preferably 200 to 4000, more preferably 1000 to 3000, and the preferred degree of saponification is preferably 80 mol % or greater, more preferably 90 mol % or greater) and a modified product thereof (a 1 to 80 mol % saponified product of the vinyl acetate units of ethylene/vinyl acetate copolymer with a molar ratio of ethylene/vinyl acetate=2/98 to 30/70, a 1 to 50 mol % partially acetalized product of polyvinyl alcohol, and so on), starch and a modified product thereof (oxidized starch, phosphate esterified starch, cationized starch, and so on), cellulose derivatives (carboxymethyl cellulose, methyl cellulose, hydroxypropyl cellulose, hydroxylethyl cellulose, and a salt thereof and so on), polyvinyl pyrrolidone, polyacrylic acid (salt), polyethylene glycol, copolymers of (meth)acrylamide and/or (meth)acrylic acid salts [(meth)acrylamide polymer, (meth)acrylamide-(meth)acrylic acid salt copolymer, (meth)acrylic acid alkyl (1 to 4 carbon atoms) ester-(meth)acrylic acid salt copolymer or the like], styrene-maleic acid salt copolymer, a Mannich modified product of polyacrylamide, condensed type formalin resin (urea-formalin resin, melamine-formaldehyde resin, and so on), polyamide polyamine or dialkylamine-epichlorohydrin copolymer, polyethyleneimine, casein, soy bean protein, synthetic protein, water soluble polymers such as a mannan galactan derivative and so on, or the like may be suggested.

One of these aqueous binders may be used alone, or two or more of them may be used in combination.

From the standpoint of binding performance, preferably, at least one rubber based binder selected from the group consisting of styrene-butadiene rubber, acrylonitrile-butadiene rubber, methyl methacrylate-butadiene rubber and methyl methacrylate rubber is included as the aqueous binder. Furthermore, since binding performance is satisfactory, preferably styrene-butadiene rubber is included as the aqueous binder.

In case styrene-butadiene rubber is employed as a aqueous binder, then, from the standpoint of enhancing the coating performance, it is preferable to use it together with the water soluble polymer described above. As a water soluble polymer that is appropriate for use together with styrene-butadiene rubber, there may be suggested polyvinyl alcohol and a modified product thereof, starch and a modified product thereof, cellulose derivatives (carboxymethyl cellulose, methyl cellulose, hydroxyethyl cellulose, and a salt thereof, and so on), polyvinyl pyrrolidone, polyacrylic acid (salt), or polyethylene glycol and so on. Among these, as a binder, a combination of styrene-butadiene rubber and carboxymethyl cellulose (salt) is preferred. The mass ratio of the styrene-butadiene rubber and the water soluble polymer contained therein is not particularly limited. However, it is preferable for it to be styrene-butadiene rubber:water soluble polymer=1:0.1 to 10, more preferably 0.5 to 2.

"Conductive additive" refers to an additive to be blended to enhance the electrical conductivity of the electrode active material layer. As the conductive additive, substantially the same materials as those mentioned for the second electrically conductive material described above, i.e. carbon material such as Ketchen black, carbon black such as acetylene black, graphite and carbon fiber may be suggested. When the active material layer includes such a conductive additive, then an electron network is effectively formed in the interior of the active material layer, and this can contribute to improvement of the output characteristics of the cell.

A conventionally known polyoxyalkylene oxide polymers, for example, polyethylene oxide (PEO) based polymers or polypropylene oxide (PPO) based polymers may be suggested for the ion conductive polymer.

For the electrolyte salt (i.e. the lithium salt), a conventionally known electrolyte salt for a lithium ion secondary cell such as $Li(C_2F_5SO_2)_2N$, $LiPF_6$, $LiBF_4$, $LiClO_4$, $LiAsF_6$, $LiCF_3SO_3$ or the like may be suggested.

The compounding ratios of the components included in the positive electrode active material layer 13 and the negative electrode active material layer 15 described hereinafter are not particularly limited. The compounding ratios may be adjusted as appropriate by reference to conventionally known expertise relating to lithium ion secondary cells. Moreover, the thickness of each of the active material layers is not particularly limited, and may be determined as appropriate by reference to conventionally known expertise relating to cells. As one example, the thickness of each of the active material layers may be around 2 to 100 μm.

Negative Electrode Active Material Layer

The negative electrode active material layer 15 includes negative electrode active material particles. Moreover, in addition to the negative electrode active material, the negative electrode active material layer 15 may include conventionally known components included in the negative electrode of a lithium ion secondary cell, such as a gel forming polymer, a binder, a conductive additive, an ion conductive polymer, a lithium salt, and so on. Apart from the type of the negative electrode active material, fundamentally the details are the same as those described in connection with the "Positive Electrode Active Material Layer", and accordingly description thereof will here be omitted. In other words, while an example has been explained of a case in which the positive electrode active material layer 13 includes a core-shell type electrode material (i.e. the positive electrode material), this description can also be applied to the negative electrode. That is to say, it is also possible for the negative electrode active material that is included in the negative electrode active material layer 15 to be a core-shell type electrode material (i.e. a negative electrode material).

For example, a carbon material such as graphite, soft carbon and hard carbon, a lithium-transition metal complex oxide (for example $Li_4Ti_5O_{12}$), a metal material, a lithium alloy based negative electrode material, or the like may be suggested for the negative electrode material. According to circumstances, it would also be acceptable to employ two or more types of negative electrode active material in combination. Preferably, from the standpoint of capacity and output characteristics, a carbon material or a lithium-transition metal complex oxide will be employed as the negative electrode active material. It should be understood that, of course, it would also be possible for other negative electrode active material than those listed above to be employed.

Furthermore, a base material (i.e. the gel forming polymer) that constitutes the shell portion of the core-shell type electrode material, in particular, has the property of easily adhering to a carbon material. Due to this, when the core-shell type electrode material is applied to a negative electrode, also from the standpoint of providing structurally stable electrode material, it is preferable to employ a carbon material as the negative electrode active material. With this type of structure, structurally more stable electrode material can be provided, since the base material described above (i.e. the gel forming polymer) becomes capable of easily adhering to the surface of the negative electrode active material where the surface is not coated with the first electrically conductive material.

The average particle diameter of the negative electrode active material (in case of a core-shell type electrode material, a part of the core portion excluding the first electrically conductive material) is not particularly limited. However, from the standpoint of higher cell output, it should be preferably 1 to 100 and more preferably 1 to 20 When the negative electrode active material particles are a core-shell type electrode material, then, from the standpoint of reducing the contact resistance, it is preferable for the average particle diameter of the negative electrode active material particles that are the core-shell type electrode material to be 1 to 20 μm.

Electrolyte Layer

The electrolyte that is employed in the electrolyte layer 17 is not particularly limited, and a liquid electrolyte, a gel polymer electrolyte, or an ionic liquid electrolyte may be used.

A liquid electrolyte has the function of acting as a carrier of lithium ions. A liquid electrolyte that constitutes the electrolyte layer has the form of a lithium salt dissolved in an organic solvent. Preferred examples of organic solvents that may be employed are carbonates such as ethylene carbonate (EC), propylene carbonate (PC), dimethyl carbonate (DMC), diethyl carbonate (DEC), ethyl methyl carbonate, and a mixture thereof. Moreover, as the lithium salt, a conventionally known electrolyte salt for a lithium ion secondary cell, such as $Li(C_2F_5SO_2)_2N$, $LiPF_6$, $LiBF_4$, $LiClO_4$, $LiAsF_6$, $LiCF_3SO_3$ may be employed. Apart from the components described above, the liquid electrolyte may also include other additives. Specific examples of such additives that may be suggested are, for example, vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyl oxymethyl ethylene carbonate, allyl oxymethyl ethylene carbonate, acryl oxymethyl ethylene carbonate, methacryl oxymethyl ethylene carbonate, ethynyl ethylene carbonate, propargyl ethylene carbonate, ethynyl oxymethyl ethylene carbonate, propargyl oxyethylene carbonate, methylene ethylene carbonate, 1,1-dimethyl-2-methylene ethylene carbonate, or the like. Among these, vinylene carbonate, methyl vinylene carbonate and vinyl ethylene carbonate are preferred, and vinylene carbonate and vinyl ethylene carbonate are more preferred. One of these cyclic carbonates may be used alone, or two or more of them may be employed in combination.

A gel polymer electrolyte has a configuration in which a liquid electrolyte described above is injected into a matrix polymer (i.e. a host polymer) that is made from an ion conductive polymer. The employment of a gel polymer electrolyte as the electrolyte eliminates the fluidity of the electrolyte, and this is excellent from the standpoint that it makes it easy to intercept ion conductivity between each of the layers. As the ion conductive polymer that is employed as the matrix polymer (i.e. as the host polymer), for example, polyethylene oxide (PEO), polypropylene oxide (PPO), polyethylene glycol (PEG), polyacrylonitrile (PAN), polyvinylidene fluoride-hexafluoro propylene (PVdF-HEP), poly methyl methacrylate (PMMA), a copolymer thereof may be suggested.

A matrix polymer for a gel polymer electrolyte is able to develop excellent mechanical strength by forming a cross-linked structure. In order to form such a cross-linked structure, polymerized polymer (for example, PEO or PPO) for forming the polymer electrolyte is subjected to polymerization processing, such as thermal polymerization, ultraviolet polymerization, radiation polymerization, electron beam polymerization, by using an appropriate polymerization initiator.

An ionic liquid electrolyte is a solution of a lithium salt dissolved in an ionic liquid. Here, "ionic liquid" refers to a series of compounds that are salts consisting only of cations and anions, and that are liquid at normal temperature.

The cation component constituting the ionic liquid is preferably at least one type selected from the group consisting of substituted or unsubstituted imidazolium ions, substituted or unsubstituted pyridinium ions, substituted or unsubstituted pyrrolium ions, substituted or unsubstituted pyrazolium ions, substituted or unsubstituted pyrrolinium ions, substituted or unsubstituted pyrrolidinium ions, substituted or unsubstituted piperidinium ions, substituted or unsubstituted triazinium ions, and substituted or unsubstituted ammonium ions.

As specific examples of the anion component constituting the ionic liquid, halide ions such as fluoride ions, chloride ions, bromide ions and iodide ions, nitrate ions ($NO_3^-$), tetrafluoro borate ions ($BF_4^-$), hexafluoro phosphate ions ($PF_6^-$), $(FSO_2)_2N^-$, $ALCl_3^-$, lactate ions, acetate ions ($CH_3COO^-$), trifluoroacetate ions ($CF_3COO^-$), methanesulfonate ions ($CH_3SO_3^-$), trifluoromethanesulfonate ions ($CF_3SO_3^-$), bis (trifluoromethanesulfonyl) imidate ions ((CF$_3$SO$_2$)$_2$N$^-$), bis (pentafluoroethylsulfonyl) imide ions (C$_2$F$_5$SO$_2$)$_2$N$^-$), tris (trifluoromethanesulfonyl) carbonate ions (CF$_3$SO$_2$)$_3$C$^-$), perchlorate ions (ClO$_4^-$), dicyanamide ions ((CN)$_2$N$^-$), organic sulfate ions, organic sulfonate ions, R$^1$COO$^-$, HOOCR$^1$COO$^-$, —OOCR$^1$COO$^-$, NH$_2$CHR$^1$COO$^-$ (here, R$^1$ is a substituent, and represents an aliphatic hydrocarbon group, an alicyclic hydrocarbon group, an aromatic hydrocarbon group, an ether group, an ester group, or an acyl group, and the substituent may include a fluorine atom), or the like may be suggested.

As examples of preferred ionic liquids, 1-methyl-3-methyl imidiazolium bis (trifluoromethanesulfonyl) imide or N-methyl-N-propylpiroridium bis (trifluoromethanesulfonyl) imide may be suggested. It would be acceptable for only one of these ionic liquids to be used alone, or two or more thereof may be used in combination.

As the lithium salt that is employed by being dissolved in the ionic liquid electrolyte, the same lithium salt that is employed in the liquid electrolyte described above may be used. The concentration of that lithium salt is preferably 0.1 to 2.0 mol/L, and more preferably 0.8 to 1.2 mol/L.

Furthermore, it would also be acceptable for the ionic liquid to include an additive as listed below. By including additives, it is possible further to improve the high rate charge-discharge characteristics and cycle characteristics. As specific examples of additives, for example, vinylene carbonate, ethylene carbonate, propylene carbonate, γ-butyrolactone, γ-valerolactone, methyl diglyme, sulfolane, trimethyl phosphate, triethyl phosphate, methoxy methyl ethyl carbonate, a fluorinated ethylene carbonate, or the like may be suggested. One of these may be employed by alone, or two or more may be employed in combination. When an additive is employed, the amount used, relative to the total weight of the ionic conductive liquid, is preferably 0.5 to 10% by mass, and more preferably is 0.5 to 5% by mass.

It would also be possible to employ a separator in the electrolyte layer, in case of a bipolar type lithium ion secondary cell. Such a separator has the function of ensuring lithium ion conductivity between the positive electrode and the negative electrode by retaining the electrolyte, and also has the function of serving as a dividing wall between the positive electrode and the negative electrode. It is particularly preferable to use a separator when a liquid electrolyte or an ionic liquid electrolyte is employed as the electrolyte.

For the form of the separator, for example, a separator made as a porous sheet from a polymer or a fiber that can absorb and retain the above described electrolyte, or a non-woven fabric separator or the like may be suggested As a separator made as a porous sheet from a polymer or a fiber, for example, a micro-porous material (a micro-porous membrane) that is used as a separator in a conventionally known type of lithium ion secondary cell may be employed. As the specific form of the porous sheet made from such a polymer or fiber, for example, a micro-porous material (a micro-porous membrane) separator made from a polyolefin such as polyethylene (PE) or polypropylene (PP) or the like, or a laminated body in which more than two of such materials are laminated together (for example, a laminated body with a three-layered structure, such as PP/PE/PP or the like), or hydrocarbon based resin such as polyimide, aramid, polyvinylidene fluoride-hexafluoro propylene (PVdF-HFP) or the like, or glass fiber, may be employed.

As for the thickness of the micro-porous material (a micro-porous membrane) separator, this cannot be stipulated unequivocally, because it varies according to the application in which the separator is employed. As one example, in an application such as secondary cells for driving electric motors for an electric automobile (EV), a hybrid electric automobile (HEV), a fuel cell automobile (FCV), or the like, a single-layer or multi-layer separator having thickness of 4 to 60 µm is preferred. Moreover, it is desirable for the diameter of the micro pores of the above mentioned micro-porous material (a micro-porous membrane) separator to be a maximum of 1 µm or less (typically, micro pores with a diameter of several tens of nm, approximately).

For the non-woven fabric separator, a conventionally known material such as cotton, rayon, acetate, nylon, polyester, a polyolefin such as PP or PE or the like, a polyimide, an aramid, or the like may be employed alone, or in a mixture. Moreover, the bulk density of such a non-woven fabric is not particularly limited, so long as sufficient cell characteristics can be obtained by impregnated polymer gel electrolyte. Furthermore, the thickness of such a non-woven fabric separator may be the same as that of the electrolyte layer, and is preferably 5 to 200 µm, and especially 10 to 100 µm.

Yet further, it is preferable for the separator to be a separator (a separator with a heat resistant insulating layer) in which a heat resistant insulating layer is laminated upon a porous substrate. Such a heat resistant insulating layer is a ceramic layer that includes inorganic particles and a binder. It is preferable for the material employed for this separator with a heat resistant insulating layer to be a high heat resistant material with a melting point or a heat softening point of 150° C. or greater, and more preferably 200° C. or greater. By providing such a heat resistant insulating layer, it is possible to obtain the effect of suppressing thermal shrinkage, because internal stresses in the separator, which increase when the temperature rises, are mitigated. Since, as a result, it is possible to prevent induction of short circuiting between the electrodes of the cell, accordingly a cell structure is obtained in which deterioration of the performance due to temperature rise is less likely to occur. Moreover, due to the provision of such a heat resistant insulating layer, the mechanical strength of this separator with heat resistant insulating layer is enhanced, and layer separation of the separator less likely occurs. Yet further, due to the effect of suppressing thermal shrinkage and increase of the mechanical strength, curling of the separator during the process of manufacturing the cell less likely occurs.

The inorganic particles in the heat resistant insulating layer contribute to the effect of suppressing thermal shrinkage and the mechanical strength of the heat resistant insulating layer. The material for these inorganic particles is not particularly limited. For example, silicon, aluminum, zirconium, or titanium oxide, (SiO$_2$, Al$_2$O$_3$, ZrO$_2$, or TiO$_2$), a hydroxide, a nitride, or a complex thereof may be suggested. These inorganic particles may be derived from mineral resources such as boehmite, zeolite, apatite, kaolin, mullite, spinel, olivine, mica, or the like, or may be prepared artificially. Moreover, it would be acceptable for a single type of these inorganic particles to be employed alone, or alternatively two or more types may be employed in combination. Among these, from the standpoint of cost, it is preferable to employ silica (SiO$_2$) or alumina (Al$_2$O$_3$), and it is more preferable to employ alumina (Al$_2$O$_3$).

The mass per unit area of the heat resistant particles is not particularly limited. However it is preferably 5 to 15 g/m$^2$. Within this range, sufficient ionic conductivity can be obtained, and moreover this range is preferred from the standpoint of maintaining the heat resistance strength.

The binder in the heat resistant insulating layer has the role of adhering the inorganic particles together, and of adhering the inorganic particles to the porous resin substrate layer. Due to this binder, the heat resistant insulating layer is formed in a stable manner, and also delamination between the porous substrate layer and the heat resistant insulating layer is prevented.

The binder that is employed in the heat resistant insulating layer is not particularly limited, and for example, a compound such as carboxymethyl cellulose (CMC), polyacrylonitrile, cellulose, ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), methyl acrylate or the like may be employed as the binder. Among these, carboxymethyl cellulose (CMC), methyl acrylate, and polyvinylidene fluoride (PVDF) are preferred. One of these compounds may be used alone, or, alternatively, two or more of them may be used in combination.

The content of the binder in the heat resistant insulating layer is preferably 2 to 20% by mass. When the content of the binder is 2% by mass or greater, then it is possible to enhance the detachment strength between the heat resistant insulating layer and the porous substrate layer, so that it is possible to enhance the vibration resistance of the separator. On the other hand, when the content of the binder is 20% by mass or less, then it is possible to ensure sufficient lithium ion conductivity, since it is possible to keep the gaps between the inorganic particles appropriate.

It is preferred for the thermal shrinkage ratio of this separator with heat resistant insulating layer to be 10% or less with respect to both MD and TD, after being held for one hour under a condition of 150° C. and 2 gf/cm$^2$. By employing a material having this type of high heat resistance, it is possible effectively to prevent shrinkage of the separator, even if the amount of heat generated at the positive electrode becomes high and the internal temperature of the cell reaches 150° C. As a result, a cell structure is obtained in which reduction of the performance due to elevation of the temperature cannot easily occur, since it is possible to prevent short circuiting between the electrodes of the cell being induced.

Positive Electrode Current Collection Plate and Negative Electrode Current Collection Plate The material constituting the current collector plates (25, 27) is not particularly limited, and any conventionally known highly electrically conductive material that is conventionally employed as a current collector plate for a lithium ion secondary cell may be used. As the material constituting the current collector plate, a metal material such as, for example, aluminum, copper, titanium, nickel, stainless steel (SUS), alloys thereof is preferred. From the standpoints of light weight, corrosion resistance, and high electrical conductivity, aluminum or copper are more preferable, and in particular aluminum is preferred. It should be understood that it would be acceptable for the same material to be employed for both the positive electrode current collection plate 27 and the negative electrode current collection plate 25; or different materials could also be used.

Sealing Part

The sealing part 29 has the function of preventing contacting between the current collectors and preventing short circuiting at the end portions of the single cell layers. The material constituting the sealing part is not particularly limited, and any material may be employed, so long as it is a good insulator, has good sealing performance against falling off of the solid electrolyte and good sealing performance (sealing characteristics) against penetration of moisture from the outside, has good heat resistance at the operating temperature of the cell, and so on. For example, acrylic resin, urethane resin, epoxy resin, polyethylene resin, polypropylene resin, polyimide resin, rubber (ethylene-propylene-diene rubber: EPDM) or the like may be employed. Moreover, it would also be acceptable to employ an isocyanate based adhesive, an acrylic resin based adhesive, a cyanoacrylate based adhesive, or the like; or a hot melt adhesive (urethane resin, polyamide resin, or polyolefin resin) or the like. Among these, from the standpoints of corrosion resistance, chemical resistance, ease of manufacture (film forming property), economic efficiency, and so on, polyethylene resin or polypropylene resin is preferably employed as the material constituting the insulating layer, and it is more preferable to employ a resin whose main component is a non-crystalline polypropylene resin and in which ethylene, propylene, and/or butane is copolymerized.

Outer Casing

For the outer casing 31, for example, that made from a laminated film including aluminum may be employed. Specifically, while a laminated film including aluminum having a three-layered structure in which, for example, PP, aluminum, and nylon are laminated together in that order or the like may be employed, this is not to be considered as being limitative in any way. Moreover, it would also be acceptable to use a conventionally known casing made from metal can as the outer casing. A laminated film is preferred, from the standpoint that it is excellent in higher output and cooling performance, and that it can be employed in an appropriate manner for a cell for large sized equipment such as an EV and a HEV. Furthermore, an aluminate laminate is more preferred for the outer casing, since it is easy to adjust the group pressure applied to a power generation element from the exterior, and also it can be easily adjusted to the desired thickness of the electrolyte layer.

EXAMPLES

In the following, the present invention will be explained in detail with reference to Examples thereof. However, the present invention should not be considered as being limited to those Examples.

Example 1

4 parts by mass of liquid epoxy and 16 parts by mass of a polyfunctional epoxy resin as resin raw material, 47 parts by mass of nickel particles with average particle diameter of 5 μm as electrically conductive particles, 0.05 parts by mass of a curing agent, and 33 parts by mass of methyl ethyl ketone were put into a metal vessel and were stirred and mixed with a high speed shearing type disperser, and thereby a coating ink was prepared.

This obtained coating ink was applied upon a resin current collector at a speed of 5 m/min with a micro bar coater, and thereby an electrically conductive layer was formed.

A cross section of this resin current collector with the electrically conductive layer formed thereupon was observed with a scanning electron microscope, was measured, and calculated, and, as a result, the average height of configuration with recesses and projections of the electrically conductive layer was 6 μm, and the average inclination angle of the configuration with recesses and projections was 40°. The average height of the configuration with recesses and projections and the average inclination angle of the configuration with recesses and projections were measured and calculated for the configuration with recesses and projections that were observed in ten fields of view of scanning electron microscopic image.

For the negative electrode active material particles, 90 parts by mass of hard carbon with average particle diameter of 16 μm and 10 parts by mass of acrylic resin were placed into an all-purpose mixer, and were stirred at room temperature (25° C.) at 150 rpm. Subsequently the resulting mixture was dried under reduced pressure for 16 hours at 120° C., and thereby a powder material from which moisture content was removed was prepared. The average particle diameter of these electrode active material particles was measured and calculated for the particles observed in ten fields of view of scanning electron microscopic image. The same applies to the following.

A mixture was prepared by adding 47 parts by mass of an electrolyte solution obtained by dissolving 1.0 mol/L of lithium hexafluorophosphate (LiPF$_6$) in a mixed solvent of 50% by mass of ethylene carbonate (EC) and 50% by mass of propyl carbonate (PC) to 100 parts by mass of the powder material obtained as described above.

The mixture thus obtained was mixed for 120 seconds at a rotational speed of 2000 rpm with a mixing deaerator (ARE250, manufactured by Thinky Co. Ltd.), and thereby a negative electrode slurry was prepared.

The negative electrode slurry thus obtained was coated upon the resin current collector upon which the electrically conductive layer had been formed by employing a mask with an electrode pattern punched out and an applicator, while controlling the amount of slurry applied, and thereby a negative electrode active material layer was formed.

The surplus electrolyte solution was sucked off from the negative electrode active material layer thus obtained with a paper wiper, and then the resin current collector with the electrically conductive layer formed thereupon was placed on it, and thereby a dummy negative electrode having three layers, i.e. a current collector/a negative electrode active material layer/a current collector, was manufactured.

Here, as the acrylic resin in this example, a resin manufactured as described below was employed.
83 parts by mass of ethyl acetate and 17 parts by mass of methanol were charged into a four-necked flask equipped with a stirrer, a thermometer, a reflux cooling tube, a dropping funnel, and a nitrogen gas inlet tube, and the temperature was raised to 68° C. Next, a blended monomer solution containing 242.8 parts by mass of methacrylic acid, 97.1 parts by mass of methyl methacrylate, 242.8 parts by mass of 2-ethyl hexyl methacrylate, 52.1 parts by mass of ethyl acetate, and 10.7 parts by mass of methanol blended together, and an initiator solution obtained by dissolving 0.263 parts by mass of 2,2'-azobis (2,4-dimethyl valeronitrile) in 34.2 parts by mass of ethyl acetate, were continuously added dropwise over four hours under stirring with a dropping funnel, while introducing nitrogen into the four-necked flask by blowing. Radical polymerization was thus performed. After completion of the dripping, an initiator solution obtained by dissolving 0.583 parts by mass of 2,2'-azobis (2,4-dimethyl valeronitrile) in 26 parts by mass of ethyl acetate was continuously added over two hours by using a dropping funnel. Furthermore, polymerization was continued for four hours at the boiling point. Then after eliminating the solvent and having obtained 582 parts by mass of resin, 1,360 parts by mass of isopropanol was added to obtain a copolymer solution having a resin concentration of 30% by mass. The number average molecular weight of the copolymer was 100,000 as measured by GPC, and the SP value was 11.2.

Example 2

A resin current collector was used, upon which was formed an electrically conductive layer similar to that of Example 1. 88.4 parts by mass of lithium nickel cobalt aluminum complex oxide with average particle diameter of 8 μm as the positive electrode active material particles, 10 parts by mass of the acrylic resin employed in Example 1, and 1.6 parts by mass of acetylene black were put into an all-purpose mixer, and were stirred at 150 rpm at room temperature (25° C.). Then the resulting mixture was dried under reduced pressure at 120° C. for 16 hours, and thereby a powder material from which moisture content was removed was prepared.

A mixture was prepared by adding 47 parts by mass of an electrolyte solution obtained by dissolving 1.0 mol/L of lithium hexafluorophosphate (LiPF$_6$) in a mixed solvent of 50% by mass of ethylene carbonate (EC) and 50% by mass of propyl carbonate (PC) to 100 parts by mass of the powder material obtained as described above.

The mixture thus obtained was mixed for 120 seconds at a rotational speed of 2000 rpm with a mixing deaerator (ARE250, manufactured by Thinky Co. Ltd.), and thereby a positive electrode slurry was prepared.

The positive electrode slurry thus obtained was coated upon the resin current collector upon which the electrically conductive layer had been formed by employing a mask with an electrode pattern punched out and an applicator, while controlling the amount of slurry applied, and thereby a positive electrode active material layer was formed.

The surplus electrolyte solution was sucked off from the positive electrode active material layer thus obtained with a paper wiper, and then the resin current collector with the electrically conductive layer formed thereupon was placed on it, and thereby a dummy positive electrode having three layers, i.e. a current collector/a positive electrode active material layer/a current collector, was manufactured.

Comparative Example 1

A flat nickel current collector was employed as the current collector.
90 parts by mass of hard carbon with average particle diameter of 16 μm as the negative electrode active material particles and 10 parts by mass of the acrylic resin employed in Example 1 were put into an all-purpose mixer, and were stirred at 150 rpm at room temperature (25° C.). Then the resulting mixture was dried under reduced pressure at 120° C. for 16 hours, and thereby a powder material from which moisture content was removed was prepared.

A mixture was prepared by adding 47 parts by mass of an electrolyte solution obtained by dissolving 1.0 mol/L of lithium hexafluorophosphate (LiPF$_6$) in a mixed solvent of 50% by mass of ethylene carbonate (EC) and 50% by mass of propyl carbonate (PC) to 100 parts by mass of the powder material obtained as described above.

The mixture thus obtained was mixed for 120 seconds at a rotational speed of 2000 rpm with a mixing deaerator (ARE250, manufactured by Thinky Co. Ltd.), and thereby a negative electrode slurry was prepared.

The negative electrode slurry thus obtained was coated upon the flat nickel current collector by employing a mask with an electrode pattern punched out and an applicator, while controlling the amount of slurry applied, and thereby a negative electrode active material layer was formed.

The surplus electrolyte solution was sucked off from the negative electrode active material layer thus obtained with a paper wiper, and then the above described flat nickel current collector was placed on it, and thereby a dummy negative electrode having three layers, i.e. a current collector/a negative electrode active material layer/a current collector was manufactured.

Comparative Example 2

A flat nickel current collector similar to the one used in Comparative Example 1 was employed. 88.4 parts by mass of lithium nickel cobalt aluminum complex oxide with average particle diameter of 8 μm as the positive electrode active material particles, 10 parts by mass of the acrylic resin employed in Example 1, and 1.6 parts by mass of acetylene black were put into an all-purpose mixer, and were stirred at 150 rpm at room temperature (25° C.). Then the resulting mixture was dried under reduced pressure at 120° C. for 16 hours, and thereby a powder material from which moisture content was removed was prepared.

A mixture was prepared by adding 47 parts by mass of an electrolyte solution obtained by dissolving 1.0 mol/L of lithium hexafluorophosphate ($LiPF_6$) in a mixed solvent of 50% by mass of ethylene carbonate (EC) and 50% by mass of propyl carbonate (PC) to 100 parts by mass of the powder material obtained as described above.

The mixture thus obtained was mixed for 120 seconds at a rotational speed of 2000 rpm with a mixing deaerator (ARE250, manufactured by Thinky Co. Ltd.), and thereby a positive electrode slurry was prepared.

The positive electrode slurry thus obtained was coated upon the flat nickel current collector by employing a mask with an electrode pattern punched out and an applicator, while controlling the amount of slurry applied, and thereby a positive electrode active material layer was formed.

The surplus electrolyte solution was sucked off from the positive electrode active material layer thus obtained with a paper wiper, and then the above described flat nickel current collector was placed on it, and thereby a dummy positive electrode having three layers, i.e. a current collector/a positive electrode active material layer/a current collector was manufactured. Parts of the specification of these examples are shown in Table 1.

TABLE 1

Current collector

| | Constitution | Average height (h) of CRP (μm) | Average inclination angle (θ) of CRP (°) | h/tan θ (μm) | Average particle diameter (A) of electrically conductive particles (μm) |
|---|---|---|---|---|---|
| E.1 | Electrically conductive layer/ Resin current collector | 6 | 40 | 7.2 | 5 |
| E.2 | Electrically conductive layer/ Resin current collector | 6 | 40 | 7.2 | 5 |
| CE.1 | Nickel current collector | 0 | 0 | — | — |
| CE.2 | Nickel current collector | 0 | 0 | — | — |

Electrode active material layer

| | Type | Average particle diameter (D) of electrode active material particles (μm) | Contact resistance (Ωcm$^2$) |
|---|---|---|---|
| E.1 | Negative electrode active material layer | 16 | 1.0 |
| E.2 | Positive electrode active material layer | 8 | 3.4 |
| CE.1 | Negative electrode active material layer | 16 | 3.5 |
| CE.2 | Positive electrode active material layer | 8 | 4.2 |

E. = Example;
CE. = Comparative Example
CRP = a configuration with recesses and projections

[Performance Evaluation]

With the dummy electrodes of the examples described above, the contact resistance between the current collector and the electrode layer was measured and calculated. Specifically, the contact resistance was measured and calculated as follows. First, using an electrical resistance measurement device (TER-200SA, manufactured by Advance-Riko Co. Ltd.), the dummy electrodes of the examples described above were sandwiched in the measurement portion having diameter of 17 mm. Then a load of 0.4 MPa was applied, and the resistance value was read. And the contact resistance between the current collector and the electrode active material layer was calculated by subtracting the bulk resistance of the current collectors, the bulk resistance of the electrode active material layer, and the contact resistance between the measurement portion and the current collectors, from the resistance value. The results obtained are also given in Table 1.

From Table 1, when Example 1 and Example 2 that are within the scope of the present invention are compared with Comparative Example 1 and Comparative Example 2 that are outside the scope of the present invention, it will be understood that the contact resistance between the resin current collector and the electrode active material layer is reduced in Example 1 and Example 2 in which an electrically conductive layer is formed to have configuration with recesses and projections that satisfies the relationship given by h/tan θ/<D.

Moreover, it is considered that the reason why, in Example 1 and Example 2, the contact resistance is reduced more than in Comparative Example 1 and Comparative Example 2 is because, along with providing the electrically conductive layer having the configuration with recesses and projections satisfying the predetermined relationship on the surface side of the resin current collector facing the electrode active material layer, also the electrode active material particles in the electrode active material layer are in the state of not being adhered to each other by the binder. In other words, since the electrode active material layer including the electrode active material particles that are not adhered by the binder has a flexibility, accordingly it can easily come into contact with the electrically conductive layer having the configuration with recesses and projections that satisfies the predetermined relationship. Due to this, it is possible more effectively to increase the contact locations between the electrically conductive layer and the electrode active material particles within the electrode active material layer. As a result, it is possible further to reduce the contact resistance between the resin current collector and the electrode active material layer.

And, according to Table 1, it will be understood that the contact resistance between the resin current collector and the electrode active material layer is further reduced in Example 1 and Example 2 in which the average height (h) of the configuration with recesses and projections is 0.1 μm or greater and 20 μm or less.

Furthermore, according to Table 1, it will be understood that, in Example 1 and Example 2 in which the electrically conductive particles contained in the electrically conductive layer satisfy the relationship A<D, the contact resistance between the resin current collector and the electrode active material layer is reduced.

Yet further, according to Table 1, it will be understood that, in Example 1 and Example 2 in which the average particle diameter (A) of the electrically conductive particles is 0.01 μm or greater and 20 μm or less, the contact resistance between the resin current collector and the electrode active material layer is further reduced.

Although the present invention has been explained above with reference to an embodiment and Examples, the present invention should not be considered as being limited by these; various alterations can be made while still remaining within the scope of the gist of the present invention.

For example, in the embodiment described above, a bipolar type lithium ion secondary cell was explained as an example. However, the type of cell to which the present invention can be applied is not particularly limited, and the present invention could be applied to any type of a conventionally known non-aqueous electrolyte secondary cell, such as a so-called parallel laminated type lithium ion secondary cell in which, in a power generation element, single cell layers are connected in parallel, or the like, and any type of a conventionally known aqueous electrolyte secondary cell.

Moreover, although a secondary cell was explained in the embodiment described above as an example, an embodiment of the cell, to which the present invention can be applied, is not particularly limited, and the present invention could be applied to any type of a conventionally known primary cell.

REFERENCE SIGNS LIST

10: lithium ion secondary cell
11: current collector
11a, 11b: outermost layer current collectors
111: resin current collector
113: electrically conductive layer
13: positive electrode active material layer
15: negative electrode active material layer
151: negative electrode active material particle
17: electrolyte layer
19: single cell layer
21: cell element
23: bipolar type electrode
25: positive electrode current collection plate
27: negative electrode current collection plate
29: sealing part
31: outer casing

The invention claimed is:

1. An electrode for a cell, comprising:
   a resin current collector being planate and containing a resin and an electrically conductive filler; and
   an electrode active material layer containing electrode active material particles disposed on at least one surface side of the resin current collector; the resin current collector comprising an electrically conductive layer including a configuration with recesses and projections on a surface side of the resin current collector, the surface side facing the electrode active material layer;
   wherein the configuration with recesses and projections satisfies the relationship specified by Formula (1) below:

$$h/\tan\theta < D \quad (1)$$

wherein h is an average height of the configuration with recesses and projections measured in micrometers, θ is an average inclination angle of the configuration with recesses and projections, and D is an average particle diameter of the electrode active material particles measured in micrometers.

2. The electrode for a cell according to claim 1, wherein the electrode active material particles are not adhered to each other with binder.

3. The electrode for a cell according to claim 1, wherein the average height (h) of the configuration with recesses and projections is 0.1 μm or greater and 20 μm or less.

4. The electrode for a cell according to claim 1, wherein:
   the electrically conductive layer contains electrically conductive particles; and
   the electrically conductive particles satisfy the relationship specified by Formula (2) below:

$$A < D \quad (2)$$

A is the average particle diameter measured in micrometers of the electrically conductive particles, and D is the average particle diameter measured in micrometers of the electrode active material particles.

5. The electrode for a cell according to claim 4, wherein the average particle diameter (A) of the electrically conductive particles is 0.01 μm or greater and 20 μm or less.

6. A cell comprising the electrode for a cell according to claim 1.

* * * * *